United States Patent
Dickens et al.

(10) Patent No.: US 11,520,786 B2
(45) Date of Patent: Dec. 6, 2022

(54) SYSTEM AND METHOD FOR OPTIMIZING EXECUTION OF RULES MODIFYING SEARCH RESULTS

(71) Applicant: International Business Machines Corporation, Armonk, NY (US)

(72) Inventors: Rachael Marie Huston Dickens, Raleigh, NC (US); Uwe Karl Hansmann, Tuebingen (DE); Dieter Buehler, Tuebingen (DE); Kelley Gordon, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 16/930,689

(22) Filed: Jul. 16, 2020

(65) Prior Publication Data

US 2022/0019584 A1   Jan. 20, 2022

(51) Int. Cl.
*G06F 16/2453* (2019.01)
*G06F 16/2455* (2019.01)
*G06N 5/02* (2006.01)
*G06F 11/34* (2006.01)
*G06F 16/248* (2019.01)

(52) U.S. Cl.
CPC .... *G06F 16/24534* (2019.01); *G06F 11/3452* (2013.01); *G06F 16/248* (2019.01); *G06F 16/24564* (2019.01); *G06N 5/025* (2013.01)

(58) Field of Classification Search
CPC .......... G06F 16/24534; G06F 11/3452; G06F 16/24564; G06F 16/248; G06N 5/025
See application file for complete search history.

(56) References Cited

U.S. PATENT DOCUMENTS

| | | | |
|---|---|---|---|
| 7,035,849 B2 | 4/2006 | Tifft | |
| 7,856,434 B2 | 12/2010 | Gluzman Peregrine | |
| 2014/0122443 A1* | 5/2014 | Gullin | G06F 16/273 |
| | | | 707/688 |
| 2015/0058174 A1 | 2/2015 | Dumon | |
| 2019/0102693 A1* | 4/2019 | Yates | G06N 20/20 |

(Continued)

FOREIGN PATENT DOCUMENTS

KR   101123426 B1   3/2012

OTHER PUBLICATIONS

Rob High, "The Era of Cognitive Systems: An Inside Look at IBM Watson and How it Works," IBM Redbooks, 2012.

(Continued)

*Primary Examiner* — William B Partridge
*Assistant Examiner* — Aryan D Toughiry
(74) *Attorney, Agent, or Firm* — Terrile, Cannatti & Chambers, LLP; Emmanuel A. Rivera

(57) ABSTRACT

A method, system and computer-usable medium for optimizing of search rules modifying search results. A rules service is initiated prior to executing a given search query from a shopper. A search rule evaluation is performed for the given search query and implementing a search rule that causes actions defined by the search rule to be applied to the given search request query. A list of search rules implemented or fired for each given search query is stored. A tracking record is built based on search rule evaluation that includes the list of implemented or fired rules and rule impact tracking (RIT) records.

15 Claims, 5 Drawing Sheets

(56) References Cited

U.S. PATENT DOCUMENTS

2019/0272470 A1* 9/2019 Bandi ................ G06K 9/6253
2021/0133196 A1* 5/2021 Gladwin ............... G06F 16/248

OTHER PUBLICATIONS

Michael Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

SYSTEM AND METHOD FOR OPTIMIZING EXECUTION OF RULES MODIFYING SEARCH RESULTS

BACKGROUND OF THE INVENTION

Field of the Invention

The present invention relates in general to the field of computers and similar technologies, and in particular to software utilized in this field. Still more particularly, it relates to a method, system, and computer-usable medium for optimizing the execution of rules modifying search results.

Description of the Related Art

With the increased usage of computing networks, such as the Internet, users are currently inundated and overwhelmed with the amount of information available to them from various structured and unstructured sources. Information gaps abound as users try to piece together what they can find that they believe to be relevant during searches for information on various subjects. To assist with such searches, recent research has been directed to generating knowledge management systems which may take an input, analyze it, and return results indicative of the most probable results to the input. Knowledge management systems provide automated mechanisms for searching through a knowledge base with numerous sources of content, e.g., electronic documents, and analyze them with regard to an input to determine a result and a confidence measure as to how accurate the result is in relation to the input.

Online commerce with numerous shoppers and merchants, makes use of such knowledge management systems. Merchants typically have various items, such as goods and services to offer shoppers. Shoppers may not be certain as to which items they would like to purchase. The use of knowledge management systems can assist merchants in selling their items and shoppers in finding items to purchase.

Typically, a prospective shopper visits a merchant's website, and searching is performed for items that are offered by the merchant. A search result list with items available from the merchant is returned to the shopper. In order to maximize profitability, merchants may use rules (i.e., search rules) that influence searches of items. For example, search rules may return search results of items that are of special interest to a merchant, such as items that have a high profit margin, items that are in high stock, items that have a great promotional value, etc. A search result list based on the search, provides for the special interest items of the merchant to be at the top of the search result list, and is returned to the shopper.

The search result list should be sent to a shopper relatively quickly. If a search takes too long, the shopper may leave the merchant's website and go to another merchant's website. Merchants' search rules can be complex and require considerable resources to process, such as computing and memory resources. The challenge is to use such search rules and maximize the resources that implement the search rules. This is especially challenging, for example, when implementing multi-tenant (i.e., merchant) micro-service based environments with multiple evaluation models processing different merchant search rules that are hosted and evaluated.

SUMMARY OF THE INVENTION

A method, system and computer-usable medium are disclosed for optimizing of search rules modifying search results. A rules service is initiated prior to executing a search query from a shopper for items from a merchant. A search rule evaluation is performed for the given search request modification by implementing search rules where conditions are determined to be true for the given search query and implementing a search rule causes actions defined by that search rule to be applied to the given search query. A list of search rules that are fired or implemented for the given search query is stored. A corresponding search rule evaluation tracking record is built based on search rule evaluation that includes rule impact tracking (RIT) records.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present application relates generally to optimizing the execution of search rules used for online commerce searching of items from a merchant. Search rules can include one or more conditions, and actions that are taken if the condition(s) is met. Search rules can be defined by merchants. Conditions (i.e., rules conditions) can be implemented as to search terms that are used, history of items ordered by specific shoppers, geo location of specific shoppers, etc. Actions (e.g., rules actions) can be used to modify search requests from shoppers before the search request is passed to a search engine which can be implemented on a knowledge management system as described herein. Collectively, search rules, conditions and actions can be referred to as artifacts.

Described herein are systems and methods that make use of search rules simplification or optimization based on providing search requests that are combined with search rules evaluation tracking information and using the data for analytics that identify the following. Rules that have no or low impact on search results. Conditions in search rules that have no or low impact on search results. Actions in search rules that have no or low impact on search results. Therefore, merchants or users that define search rules can optimize the search rules.

In certain implementations, artifacts that remain below a configurable threshold for a configurable amount of time either get automatically removed or "muted." Merchants that define the search rules are able to review muted artifacts and make a determination to remove or re-enable such artifacts. The latter approach allows users to review all muted artifacts and perform a conscious decision to remove the artifact(s) or to re-enable the artifact(s). In certain implementations, the configurable threshold can be dynamically based on resources (e.g., computing, memory, etc.) of a device(s), system, computing source, etc. that provides the searching.

Figure 1:
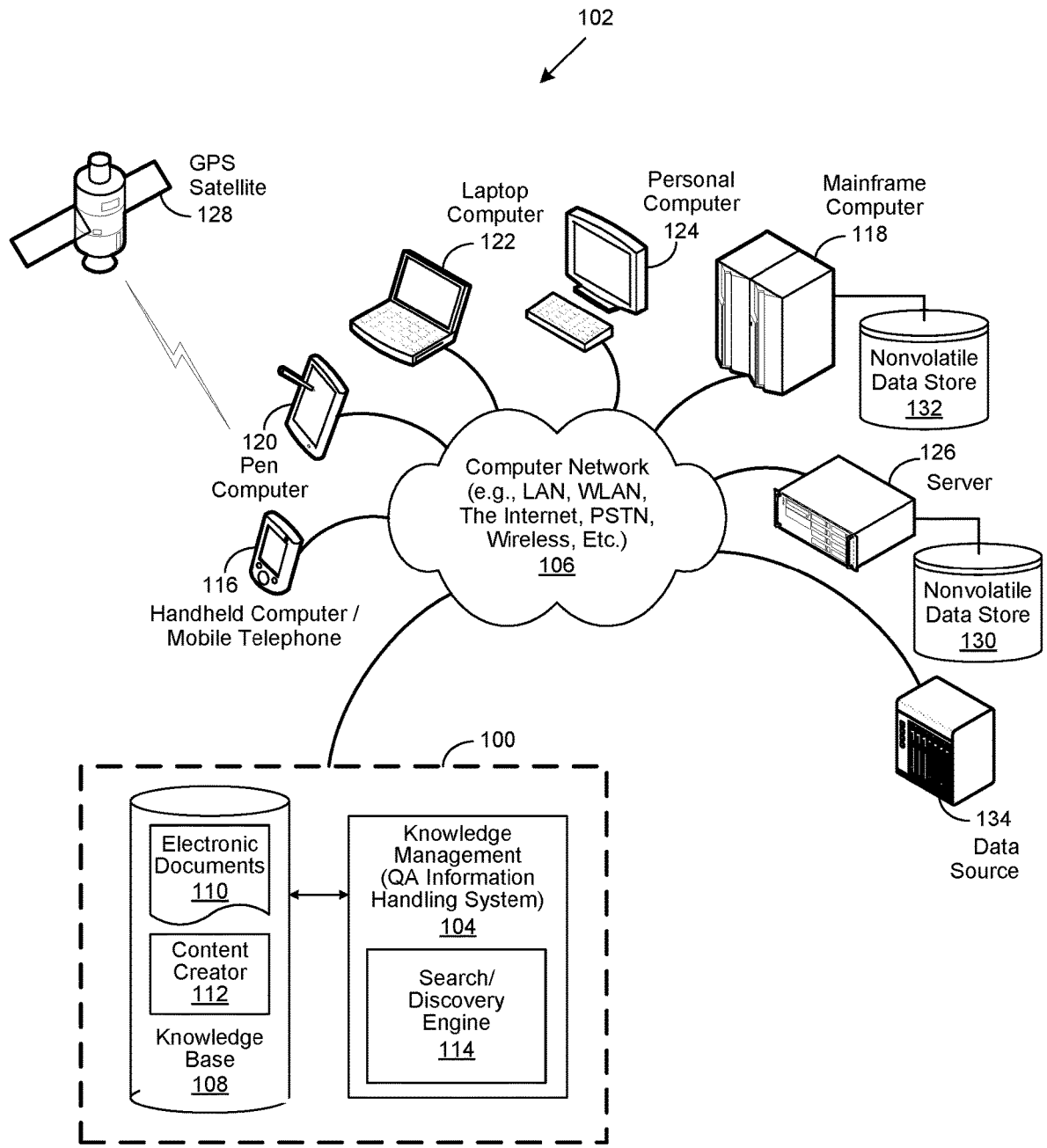
FIG. 1 depicts a network environment that includes a knowledge management system.

FIG. 1 depicts a schematic diagram of one illustrative embodiment of a knowledge management system (e.g., a question/answer creation (QA)) system 100 which is instantiated in a distributed knowledge manager in a computer network environment 102. One example of a question/answer generation which may be used in conjunction with the principles described herein is described in U.S. Patent Application Publication No. 2011/0125734, which is herein incorporated by reference in its entirety. Knowledge management system 100 may include a knowledge management information handling system computing device 104 (comprising one or more processors and one or more memories, and potentially any other computing device elements generally known in the art including buses, storage devices, communication interfaces, and the like) connected to a computer network 106. The network environment 102 may include multiple computing devices in communication with each other and with other devices or components via one or more wired and/or wireless data communication links, where each communication link may comprise one or more of wires, routers, switches, transmitters, receivers, or the like. Knowledge management system 100 and computer network environment 102 may enable question/answer (QA) generation functionality for one or more content users. Other embodiments of Knowledge management system 100 may be used with components, systems, sub-systems, and/or devices other than those that are depicted herein.

Knowledge management system 100 may be configured to receive inputs from various sources. For example, knowledge manager 100 may receive input from the computer network environment 102, computer network 106, a knowledge base 108 which can include a corpus of electronic documents 110 or other data, a content creator 112, content users, and other possible sources of input. In various embodiments, the other possible sources of input can include location information. In one embodiment, some or all of the inputs to knowledge management system 100 may be routed through the computer network 106. The various computing devices on the computer network environment 102 may include access points for content creators and content users. Some of the computing devices may include devices for a database storing the corpus of data. The knowledge manager information handling system computing device 104 further includes search/discovery engine 114.

The computer network environment 102 may include local network connections and remote connections in various embodiments, such that knowledge management system 100 may operate in environments of any size, including local and global, e.g., the Internet. Additionally, knowledge management system 100 serves as a front-end system that can make available a variety of knowledge extracted from or represented in documents, network-accessible sources and/or structured data sources. In this manner, some processes populate the knowledge management system 100 with the knowledge, also including input interfaces to receive knowledge requests and respond accordingly.

In one embodiment, the content creator 112 creates content electronic documents 110 for use as part of a corpus of data with knowledge manager 100. The content in electronic documents 110 may include any file, text, article, or source of data for use in knowledge manager 100. Content users may access knowledge manager 100 via a network connection or an Internet connection (represented as to the computer network 106) and may input questions to knowledge management system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language Processing (NLP), such that knowledge management system 100 can be considered as an NLP system, which in certain implementations performs the methods described herein. In one embodiment, the process sends well-formed questions (e.g., natural language questions, etc.) to the knowledge manager. Knowledge management system 100 may interpret the question and provide a response to the content user containing one or more answers to the question. In some embodiments, knowledge management system 100 may provide a response to users in a ranked list of answers. In various embodiments, the one or more answers take into account location information.

One such knowledge management information handling system computing device 104 is the IBM Watson™ system available from International Business Machines (IBM) Corporation of Armonk, N.Y. The IBM Watson system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

In some illustrative embodiments, knowledge management system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds, or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge management system 100 range from small handheld devices, such as handheld computer/mobile telephone 116 to large mainframe systems, such as mainframe computer 118. Examples of handheld computer 116 include personal digital assistants (PDAs), personal entertainment devices, such as MP3 players, portable televisions, and compact disc players. Other examples of information handling systems include pen, or tablet, computer 120, laptop, or notebook, computer 122, personal computer system 124, and server 126. In certain embodiments, the location information is determined through the use of a Geographical Positioning System (GPS) satellite 128. In these embodiments, a handheld computer or mobile telephone 116, or other device, uses signals transmitted by the GPS satellite 128 to generate location information, which in turn is provided via the computer network 106 to the knowledge manager system 100 for processing. As shown, the various information handling systems can be networked together using computer network 106. Types of computer network 106 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems.

Many of the information handling systems include nonvolatile data stores, such as hard drives and/or nonvolatile memory. Some of the information handling systems shown in FIG. 1 depicts separate nonvolatile data stores (server 126 utilizes nonvolatile data store 130, and mainframe computer 118 utilizes nonvolatile data store 132. A nonvolatile data store 134 can be a component that is external to the various information handling systems or can be internal to one of the information handling systems. An illustrative example of an information handling system showing an exemplary processor and various components commonly accessed by the processor is shown in FIG. 2.

Figure 2:
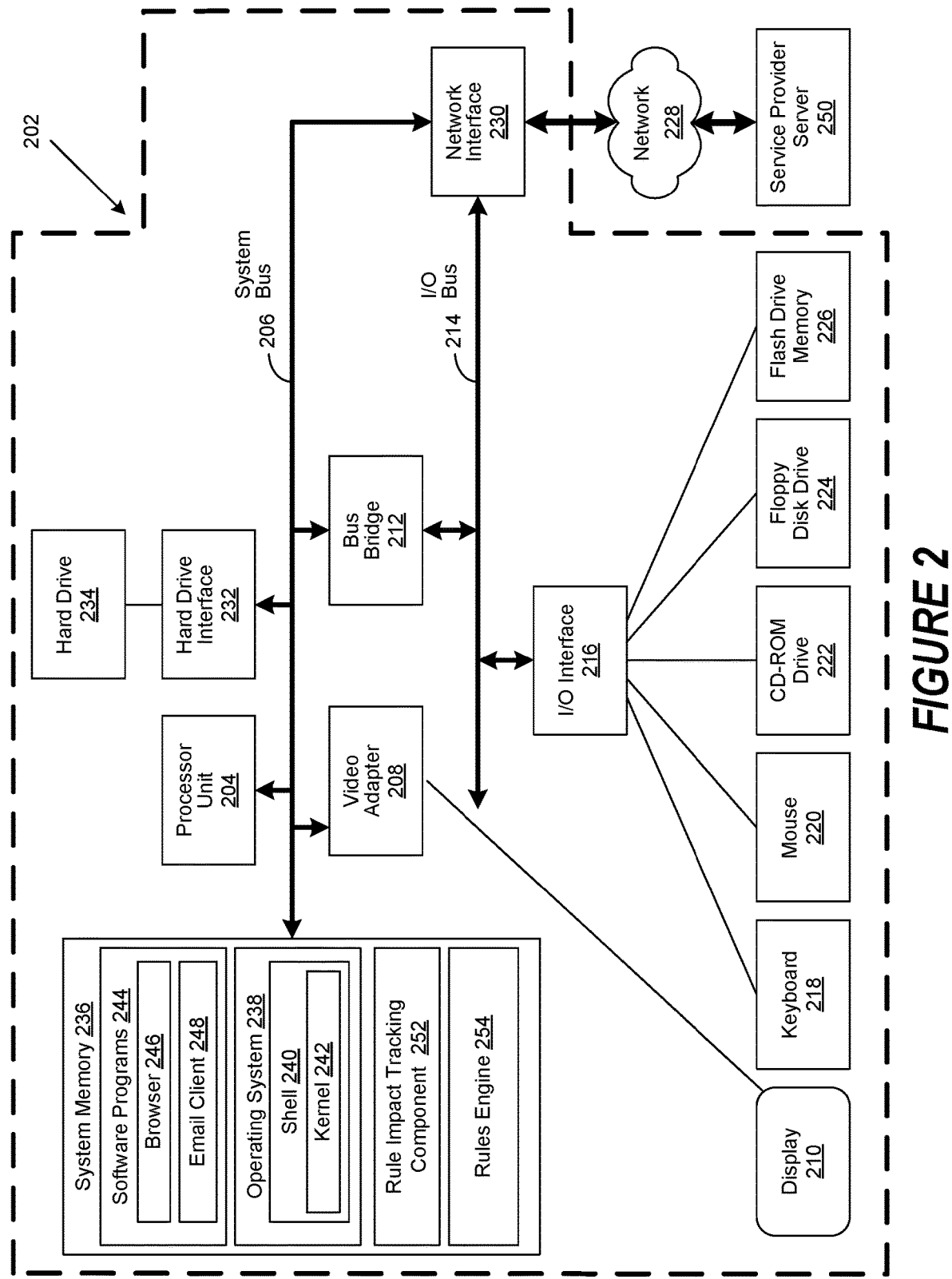
FIG. 2 is a simplified block diagram of an information handling system capable of performing computing operations.

FIG. 2 illustrates an information processing handling system 202, more particularly, a processor and common components, which is a simplified example of a computer system capable of performing the computing operations described herein. In various embodiments, the knowledge management information handling system computing device 104 described in FIG. 1, is implemented as information processing handling system 202.

Information processing handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing information handling system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 250. In certain implementations, the network 228 is computer network 106 described in FIG. 1.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing information handling system 202) to send and receive network messages to the Internet using Hyper Text Transfer Protocol (HTTP) messaging, thus enabling communication with service provider server 250. In various embodiments, software programs 244 may also include a natural language processing system 252. In various implementations, the natural language processing system 252 can include a false negation module 254 and a binary classifier 256. In these and other embodiments, the invention 250 includes code for implementing the processes described herein below. In one embodiment, the information processing information handling system 202 is able to download the natural language processing system 252 from the service provider server 250.

The hardware elements depicted in the information processing information handling system 202 are not intended to be exhaustive, but rather are representative to highlight components used by the present invention. For instance, the information processing information handling system 202 may include alternate memory storage devices such as magnetic cassettes, Digital Versatile Disks (DVDs), Bernoulli cartridges, and the like. These and other variations are intended to be within the spirit, scope, and intent of the present invention.

In various embodiments, the system memory 236 includes a rule impact tacking (RIT) component 252 and rules engine 254. In various implementations, and as further described herein, the RIT component 252 records executed search requests from shoppers. Furthermore, the RIT component 252 can record a corresponding search rules evaluation tracking record for search requests. In various implementations, the rules engine 254 triggers search rules evaluation for given search request for items from a merchant, tracks search rules that are triggered for a given search request rule file list (RFL) and returns search result of list of items to the requesting shopper.

Figure 3:
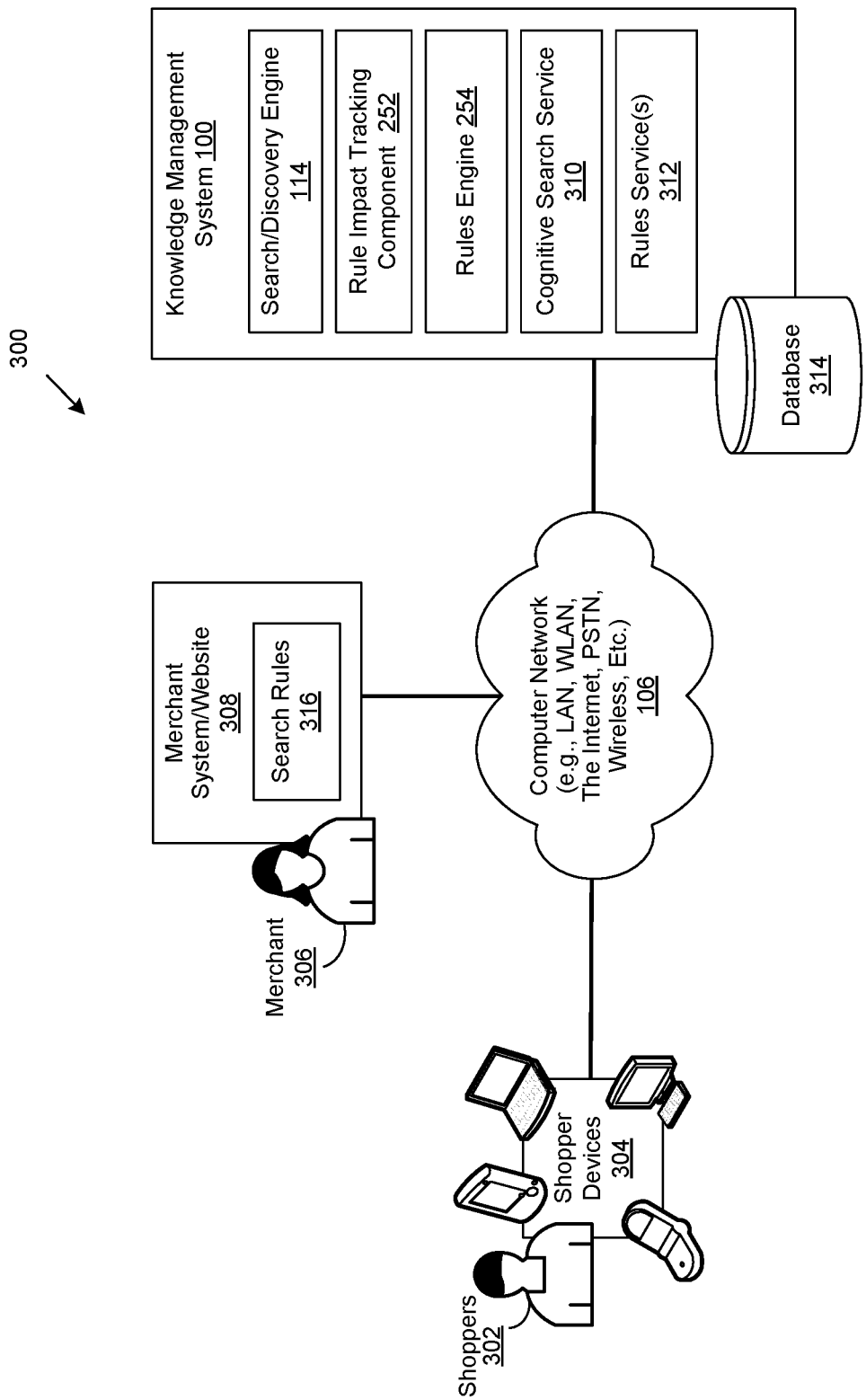
FIG. 3 is a simplified block diagram of a system capable of implementing the described operations and methods.

FIG. 3 shows a system capable of implementing the described operations and methods. In particular, the system 300 provides for optimizing the execution of search rules modifying search result lists that are provided to shoppers, and particularly for optimizing the execution of search rules used when shoppers search for items from a merchant.

The system 300 includes the computer network 106 described above, which connects multiple shoppers 302 through shopper devices 304 to various other devices, systems, services, etc. as further described herein. In particular, a shopper device 304 can be implemented as an information handling system. Examples of shopper device 304 can include a personal computer, a laptop computer, a tablet computer, a personal digital assistant (PDA), a smart phone, a mobile telephone, smart watch (i.e., wearables), or other device that is capable of communicating and processing data.

The system 300 includes the knowledge management system 100 described in FIG. 1. It is to be understood that in certain embodiments, the knowledge management system 100 can be implemented as a cloud based system, and that in certain embodiments, the knowledge management system 100 is implemented as one or more information handling systems with limited resources (e.g., computing, memory, etc.). In various implementations, the knowledge management system 100 supports multiple search and search rule services for multiple merchants.

Shopper devices 304 allow shoppers 302 to access knowledge management system 100 to perform searching, such as searching for items provided by merchants, as represented by merchant 306 and merchant system/website 308. In various implementations, the shoppers 302 visit a website of merchant system/website 308 to initiate a search of items provided by merchant 306.

In various embodiments, the knowledge management system 100 includes the search/discovery engine 114 described in FIG. 1, and the rule impact tracking (RIT) component 252 and rules engine 254 described in FIG. 2. In certain embodiments, the knowledge management system 100 includes a cognitive search service 310 and a rules service(s) component 312. In a multi-service architecture, cognitive search service 310 and rules service(s) component 312 can be two of several services that are provided. In certain implementations, the cognitive search service 310 is included in search/discovery engine 114. The knowledge management system 100 further can include or is configured to a database 314.

The knowledge management system 100 and merchant system/website 308 connect to the computer network 106. In various implementations, the knowledge management system 100 provides search and search rule services to merchant(s) 306 and merchant system(s)/website(s) 308. Certain implementations provide for merchant system/website 308 to include search rules 316.

In certain implementations, the knowledge management system 100 communicates with shopper devices 304, and particularly with web browsers at shopper devices 304. Search result lists can be returned by cognitive search service 310 to another service of the knowledge management system 100, such as search/discovery engine 114, that processes search result lists and generates html pages that can be sent to browsers at shopper devices 304.

In certain implementations, such as single page application architectures, browsers at shopper devices 304 load a single page application, then load an online website of a shop a merchant 306 (e.g., merchant system/website 308). The single page application of the page of the browser of shopper device 304 can directly send a REST API to a server, such as at merchant system/website 308, which in turn dispatches the REST API request to the knowledge management system 100.

The search rules 316 can be defined by merchant 306. As described, the search rules 316 can include one or more conditions, and actions that are taken if the condition(s) is(are) met. Conditions (i.e., rules conditions) can be implemented as to search terms that are used, history of items ordered by specific shoppers, geo location of specific shoppers, etc. Actions (e.g., rules actions) are used to modify search requests from shoppers 302 before the search request is passed to the search/discovery engine 114 of the knowledge management system 100.

In an implementation, when a shopper 306 performs a search for items, a search query is initiated by shopper device 304 at merchant system/website 308. The cognitive search service 310 is called, which in turn calls the rules service(s) 310 prior to the search/discovery engine 114 performing a search for items of the merchant 306.

The rules engine 254 triggers a search rules evaluation for the given search query from shopper 302 for items from merchant 306, and stores fired or implemented rules for the given search query as a rules fired list (RFL). The rules engine 254 returns a corresponding search rules evaluation result.

The cognitive search service 310 receives the corresponding search rules evaluation result and a search query is performed according to the corresponding search rules evaluation result. The RIT component 252 builds and persistently stores rule impact tracking records in database 314. Search rules evaluation tracking records built by the RIT component 252 can include search context, the RFL provided by rules engine 254, list of document identifier as to items from merchant 306, etc. The search result list can then be sent to the shopper 302. In certain implementations, the search rules 316 are automatically updated based on the results.

Therefore, in various implementations, the RIT component 252 can record executed search queries and corresponding search rules evaluation tracking records. A search rules evaluation tracking record can include information as to all search rules that have been implemented (i.e., search rules for which all conditions were determined to be true), for the particular search query based on an RFL and all conditions in general that are determined to be true, including conditions defined in search rules that were not implemented, because not all conditions were met.

An asynchronous process takes place, which reads search rules evaluation tracking record, and performs the recorded search request again, but without applying any rules. The difference from the result of the search request that are compared to actual results provides an overall impact of the set of search rules that were implemented for the record search request modification. The difference is ranked depending where the changes occur. For example, if the search results list is not changed in the top 50 entries, then the impact is 0 (zero). The more a particular modification impacts the top of the search result list, the higher the impact.

To determine the impact of individual search rules, the search request is executed again, with the specific search rule under consideration is activated, while all other search rules are muted. The difference between the search result based on the individual search rule and the actual search result in relation to the overall impact of the search rule set defines the impact for the given individual search rule. The symmetric logic can be applied for the conditions and actions contain in search individual search rules. In certain implementations, in order to adjust to changes in search behavior, the RIT component 252 can discard outdated data at specified time intervals.

Figure 4:
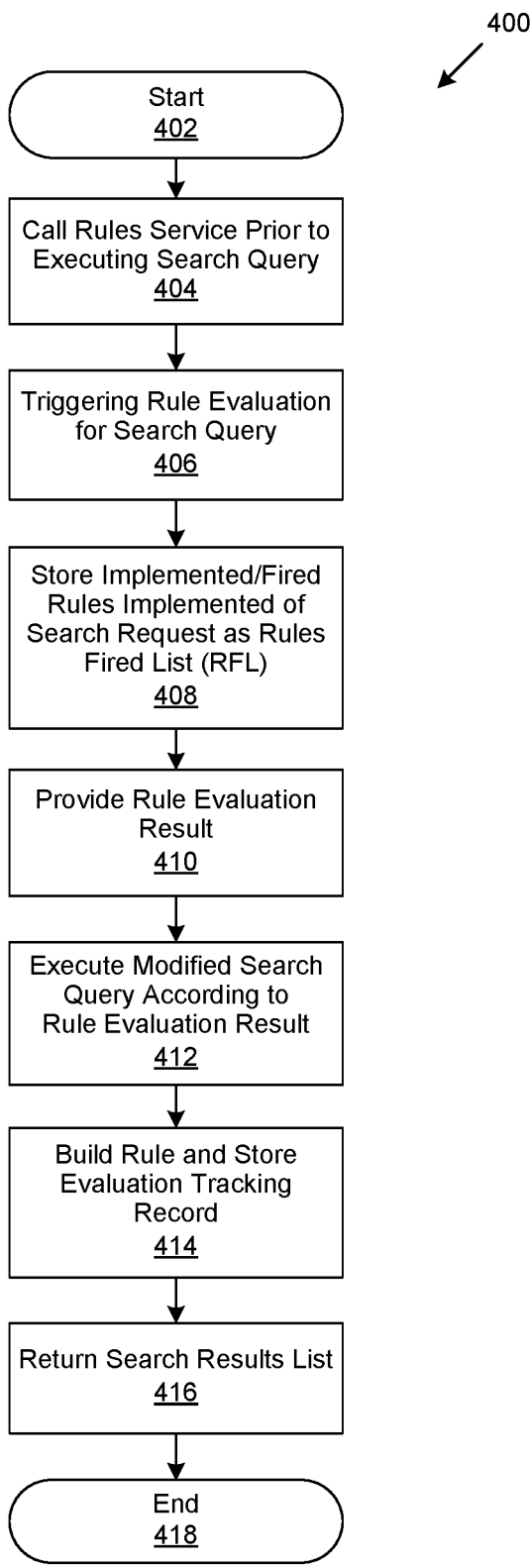
FIG. 4 is a generalized flow chart for search rule optimization recommendations.

FIG. 4 is a generalized flowchart for search rules evaluation tracking. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 402, the process 400 starts. At step 404, a rules service, such as rules service(s) 312 is called prior to executing a given search query from a shopper 302. The calling can be performed, for example, by the cognitive search service 310.

At step 406, triggering search rules evaluation for a given search request modification is performed. The triggering can be performed by rules engine 254. At step 408, rules that are implemented or fired for the given search query are stored as a particular rules fired list (RFL). The rules engine 254 can perform the storing. At step 410, a corresponding search rules evaluation result is provided. The rules engine 254 can perform the providing.

At step 412, a modified search query according to the search evaluation result is executed. The cognitive search service 310 can perform the executing.

At step 414, search rules evaluation tracking record is built and stored. The building and storing can be performed by the RIT component 252. Search rules evaluation tracking records can be persistently stored in database 314. The search rules evaluation tracking record can include search context, RFL as provided by rules engine 254, list of document identifiers as to items from merchant 306, etc.

At step 416, search result is returned, and can be made available to the requesting shopper 302. At step 418, the process 400 ends.

Figure 5:
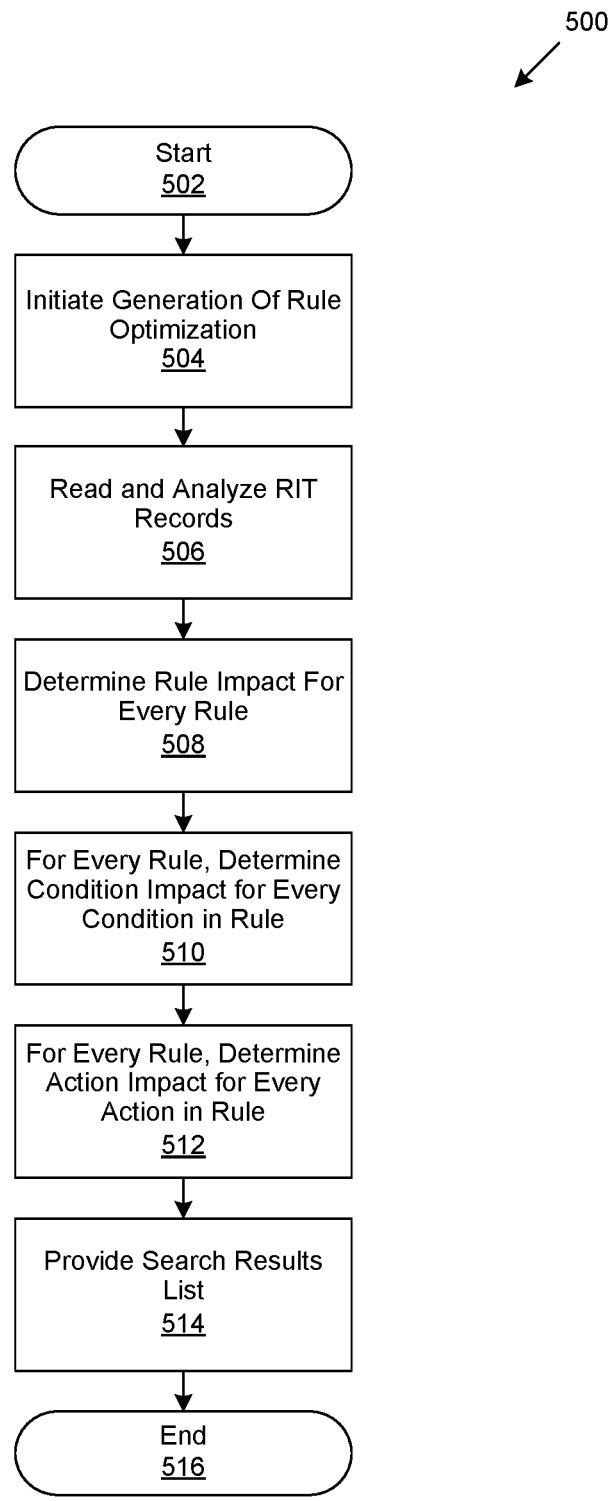
FIG. 5 is a generalized flow chart for generating search rule optimization recommendations.

FIG. 5 is a generalized flowchart for generating search rule optimization recommendations. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, the generation for search rule optimization recommendations is initiated. A shopper 302 initiates a search request for items from a merchant 306.

At step 506, rule impact tracking (RIT) records are read and analyzed. The rules engine 254 can perform the reading and analyzing. In certain implementations, the RIT records are stored in database 314. The reading and analyzing can be performed over a configurable time frame as defined by the user (e.g., merchant), for example over the last "N" of days RIT records were stored.

At step 508, for a given set of all search rules as defined by the user, a determination is performed as to rule impact (RI) for every search rule by analyzing rules file list (RFL) in all RIT entries. For example, if search rule "X" was implemented (i.e., fired) two times in 10K search requests, then RI(X)=0.0002. The determination can be performed by rules engine 254.

At step 510, for every rule, a determination is performed as to condition impact (CI) for every condition in the rule. For example, a condition "Y" is defined as the "user-segment=gold customer". If the condition "Y" made a difference on the search rule implementing (i.e., firing) or not three times in 10K search requests, then CI (X, Y)=0.0003. The determination can be performed by rules engine 254.

Therefore, in determining condition impact or CI, defined by a rule, RFLs that invoke the recorded search requests can be compared with the given condition enabled and disabled. A percentage can be returned as to which condition(s) caused a difference.

At step 512, every rule, a determination is performed as to action impact (AI) for every action in the rule. For example, an action "Z" is defined as "boost=brand:somebrand." If the action "Z" made an average difference on search results of 0.001, then AI (X, Z)=0.001.

Therefore, in determining action impact or AI, defined by a rule, search results that invoke the recorded search results can be compared with given condition disable and disabled. For example, results can be returned as to an average normalized editing distance of two results for the top "N" items in a ranked search result.

At step 514, a search result list is provided to the requesting shopper 302. In addition, search evaluation tracking records in database 314 can be updated with the following. A list of search rules with an RI lower than a configurable threshold. A list of conditions in search rules with an CI lower than a configurable threshold. A list of actions in search rules with an AI lower than a configurable threshold. At step 516, the process 500 ends.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for optimizing of search rules modifying search results comprising:
   initiating a rules service prior to executing a given search query, wherein the search rules are defined by conditions and actions,
   performing a search rule evaluation for the given search query by implementing search rules where conditions are determined to be true for the given search request modification, and implementing a search rule causes actions defined by that search rule to be applied to the given search query;
   storing as rules fired list (RFL) a list of search rules implemented for the given search query;
   building a corresponding search rule evaluation tracking record based on search rule evaluation that includes the RFL and rule impact tracking (RIT) records that includes search context and list of document identifiers; and
   determining a rule impact (RI) for every search rule of a given set of rules, by analyzing RFLs in all RIT records, wherein a list of search rules is provided with RI lower than a configurable threshold;
   determining a condition impact (CI) for every condition in a search rule which determines if a condition made a difference in the search rule, wherein the list of search rules is provided with a CI lower than a second configurable threshold and;
   determining an action impact (AI) for every action in the search rule which determines if an action made a difference in a search result, wherein the list of search rules is provided with a CI lower than a third configurable threshold.

2. The method of claim 1 further comprising reading and analyzing the rule impact tracking records over a configurable time frame.

3. The method of claim 1, wherein determining the CI comprises for every condition defined by the rule comparing RFLs to invoke recorded search requests with a given condition enabled or disabled and providing a percentage which the given condition caused a difference.

4. The method of claim 1, wherein determining the AI comprises for every action defined by the rule comparing search results to invoke recorded search results with a given action enabled and disabled and providing an averaged normalized editing distance.

5. The method of claim 1 further comprising automatically optimizes search rules for a merchant.

6. A system comprising:
   a processor;
   a data bus coupled to the processor; and
   a computer-usable medium embodying computer program code, the computer-usable medium being coupled to the data bus, the computer program code used for optimizing of search rules modifying search results and comprising instructions executable by the processor and configured for:
   initiating a rules service prior to executing a given search query, wherein the search rules are defined by conditions and actions,
   performing a search rule evaluation for the given search query by implementing search rules where conditions are determined to be true for the given search request modification, and implementing a search rule causes actions defined by that search rule to be applied to the given search query;
   storing as rules fired list (RFL) a list of search rules implemented for the given search query;
   building a corresponding search rule evaluation tracking record based on search rule evaluation that includes the RFL and rule impact tracking (RIT) records that includes search context and list of document identifiers; and
   determining a rule impact (RI) for every search rule of a given set of rules, by analyzing RFLs in all RIT records, wherein a list of search rules is provided with RI lower than a configurable threshold;
   determining a condition impact (CI) for every condition in a search rule which determines if a condition made a difference in the search rule, wherein the list of search rules is provided with a CI lower than a second configurable threshold and;
   determining an action impact (AI) for every action in the search rule which determines if an action made a difference in a search result, wherein the list of search rules is provided with a CI lower than a third configurable threshold.

7. The system of claim 6 further comprising reading and analyzing the rule impact tracking records over a configurable time frame.

8. The system of claim 6, wherein determining the CI comprises for every condition defined by the rule comparing RFLs to invoke recorded search requests with a given condition enabled or disabled and providing a percentage which the given condition caused a difference.

9. The system of claim 6, wherein determining the AI comprises for every action defined by the rule comparing search results to invoke recorded search results with a given action enabled and disabled and providing an averaged normalized editing distance.

10. A non-transitory, computer-readable storage medium embodying computer program code, the computer program code comprising computer executable instructions configured for:
    initiating a rules service prior to executing a given search query, wherein the search rules are defined by conditions and actions,
    performing a search rule evaluation for the given search query by implementing search rules where conditions are determined to be true for the given search request modification, and implementing a search rule causes actions defined by that search rule to be applied to the given search query;
    storing as rules fired list (RFL) a list of search rules implemented for the given search query;
    building a corresponding search rule evaluation tracking record based on search rule evaluation that includes the RFL and rule impact tracking (RIT) records that includes search context and list of document identifiers; and determining a rule impact (RI) for every search rule of a given set of rules, by analyzing RFLs in all RIT records, wherein a list of search rules is provided with RI lower than a configurable threshold;

determining a condition impact (CI) for every condition in a search rule which determines if a condition made a difference in the search rule, wherein the list of search rules is provided with a CI lower than a second configurable threshold and;

determining an action impact (AI) for every action in the search rule which determines if an action made a difference in a search result, wherein the list of search rules is provided with a CI lower than a third configurable threshold.

11. The non-transitory, computer-readable storage medium of claim 10 further comprising reading and analyzing the rule impact tracking records over a configurable time frame.

12. The non-transitory, computer-readable storage medium of claim 10 further comprising for every rule, determining a rule impact (RI) for a given set of rules, by analyzing RFLs in all RIT records, determining a condition impact (CI) for every condition in a rule, and determining an action impact (AI) for every action in the rule.

13. The non-transitory, computer-readable storage medium of claim 10, wherein determining the CI comprises for every condition defined by the rule comparing RFLs to invoke recorded search requests with a given condition enabled or disabled and providing a percentage which the given condition caused a difference.

14. The non-transitory, computer-readable storage medium of claim 10, wherein determining the AI comprises for every action defined by the rule comparing search results to invoke recorded search results with a given action enabled and disabled and providing an averaged normalized editing distance.

15. The non-transitory, computer-readable storage medium of claim 10, further comprising automatically optimizes search rules for a merchant.

* * * * *